Dec. 13, 1938.  F. H. GULLIKSEN  2,140,355
CONTROL APPARATUS
Filed July 16, 1935
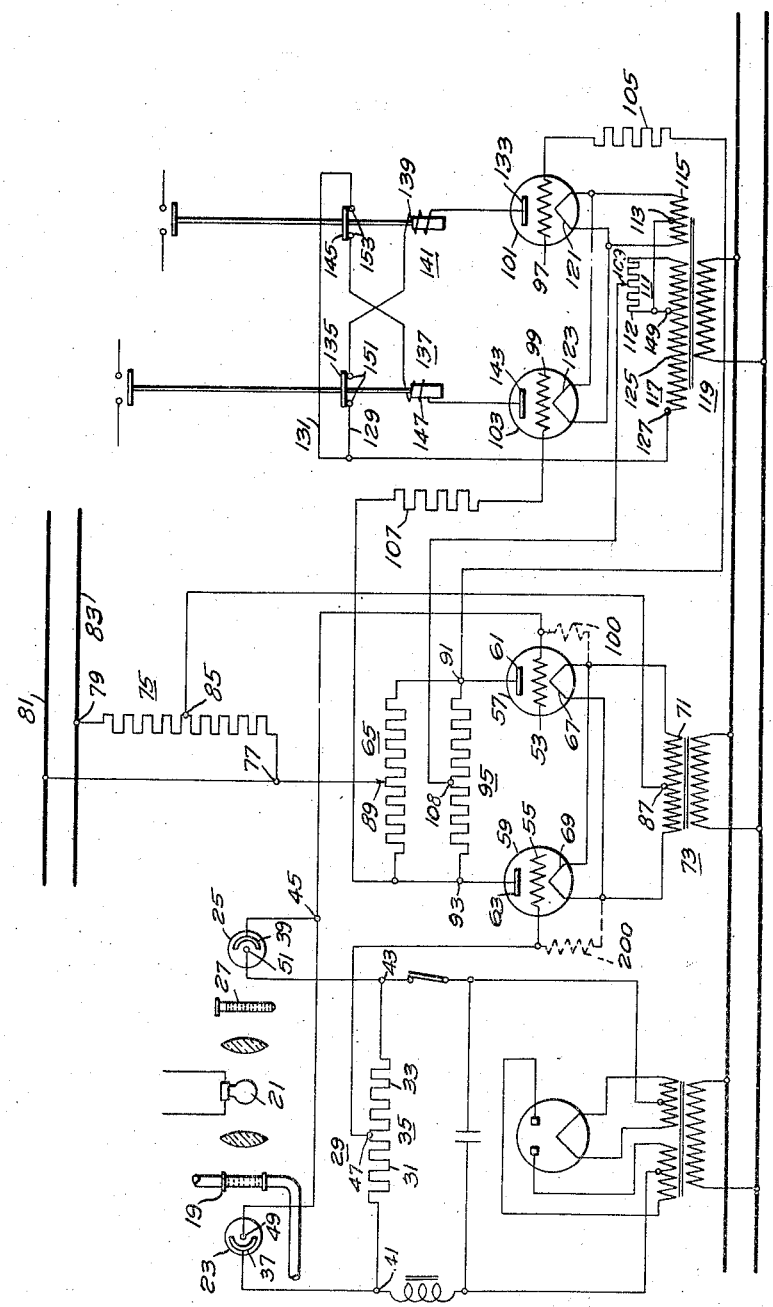
WITNESSES:
E. A. McCloskey
Hymen Diamond
INVENTOR
Finn H. Gulliksen.
BY
F. W. Lyle.
ATTORNEY Patented Dec. 13, 1938

2,140,355

UNITED STATES PATENT OFFICE 2,140,355

CONTROL APPARATUS

Finn H. Gulliksen, Wilkinsburg, Pa., assignor to Westinghouse Electric & Manufacturing Company, East Pittsburgh, Pa., a corporation of Pennsylvania Application July 16, 1935, Serial No. 31,629

12 Claims. (Cl. 250—41.5)

My invention relates to control apparatus and it has particular relation to apparatus in which the control is attained by balancing one electrical effect against another.

The present application is a continuation-in-part of my copending application Serial No. 637,771, filed October 14, 1932.

It is an object of my invention to provide a highly sensitive control system.

Another object of my invention is to provide a highly sensitive control system of the type incorporating a balanced network which is to be unbalanced for control purposes.

A further object of my invention is to provide a novel system for selectively amplifying the output of a normally balanced network when it is in unbalanced condition in accordance with the polarity of the unbalanced network. An incidental object of my invention is to provide a highly sensitive photo-sensitive system of the type in which photo-sensitive elements are balanced against each other and an electrical effect is produced when there is an unbalance in the illumination impinging on the elements.

Another incidental object of my invention is to provide a highly sensitive balanced network of the type in which certain of the arms are of high impedance.

A further incidental object of my invention is to provide a highly sensitive amplifying system of the type in which a plurality of amplifiers operated in the saturation region of their characteristic are balanced against each other.

According to my invention I provide control apparatus in which a balanced network such as a Wheatstone bridge is incorporated. In a specific embodiment of the invention the illumination impinging on two photo-sensitive devices connected in the arms of a bridge is compared. When the illumination is such that the bridge is unbalanced a difference of potential is produced between its output terminals. My invention essentially contemplates the provision of a sensitive amplifying system for the difference of potential produced.

To accomplish this object, a plurality of discharge devices incorporating control electrodes are provided. The output terminals of the network are connected to the control electrodes of the discharge devices. In the preferred practice of my invention the control electrodes of the discharge devices are otherwise entirely disconnected from the other elements of the apparatus and from the balanced network. By reason of this connection, substantially the whole difference of potential existing between the output terminals of the network is impressed between the control electrode and a principal electrode of one of the discharge devices.

My analysis of prior art systems has revealed that in the prior art systems only a fraction of the output potential of the network is impressed between the control electrode and a principal electrode of the active discharge device. My system thus constitutes a marked improvement over the prior art apparatus.

The novel features that I consider characteristic of my invention are set forth with particularity in the appended claims. The invention, itself, however, both as to its organization and its method of operation, together with additional objects and advantages thereof will best be understood from the following description of a specific embodiment when read in connection with the accompanying drawing, in which the single figure is a diagrammatic view showig an embodiment of my invention.

The apparatus shown in the drawing comprises a transparent element 19, the light transmissibility of which is to be compared with that of another element 27. In the practice of my invention, the element 19 may be a test sample of a titrated solution for example, and the element 27 a standard. To compare the elements 19 and 27, both elements are illuminated by a suitable source 21 and the radiations transmitted by the elements are projected on a plurality of photo-sensitive devices 23 and 25.

The photo-sensitive devices 23 and 25 comprise the adjacent arms of a balanced network 29 of the type similar to a Wheatstone bridge. The other arms of the network 29 are properly subdivided portions 31 and 33 of a resistor 35 which is connected between the cathode 37 and the anode 51 of photo-sensitive devices 23 and 25, respectively. Potential is applied between the junction points 41 and 43 of the resistor 35 and the cathode 37 of one device 23 and the anode 51 of the other device 25 from a suitable power source, the output of which is rectified and suitably filtered.

The output terminals 45 and 47 of the bridge comprising the junction points of the anode 49 and the cathode 39 of the photo-sensitive devices 23 and 25 respectively and the other tap of the resistor 35 are connected respectively to the control electrodes 53 and 55 of a plurality of electric-discharge devices 57 and 59. The discharge devices 57 and 59 may be of the high vacuum or gas or vapor filled type. The anodes 61 and 63 of the devices 57 and 59 are connected to each other through a variable tap potentiometer 65. The cathodes 67 and 69 of the devices 57 and 59 are energized from the secondary 71 of a common transformer 73 and are therefore substantially at a common potential. Plate potential is supplied to the electric discharge devices 57 and 59 from potentiometer 75, the terminals 77 and 79 of which are connected to the bus lines 81 and 83 of a direct current power supply source (not shown). The mid-tap 85 of the potentiometer 75 is connected to the center tap 87 of the secondary 71 of the transformer 73 whereby the cathodes 67 and 69 of the electric-discharge devices 57 and 59 are energized while its lower terminal tap 77 is connected to the movable tap 89 of the potentiometer 65 that is coupled between the anodes 61 and 63 of the electric discharge devices.

The path between the anodes 61 or 63 and the cathodes 67 or 69 may be designated as electric discharge paths. The circuits or networks having in common the windings of potentiometer 75 between points 77 and 85 and including the cathodes 67 and 69 and the respective conductors between the anodes 61 and 63 and the point 77 and between the cathodes 67 and 69 and the point 85 may each be designated as a current supply channel.

According to the preferred practice of my invention the control electrodes 53 and 55 of the discharge devices 57 and 59 are connected only to the output terminals 45 and 47 of the network 29. By reason of this connection the sensitivity of this system is high. To more clearly illustrate the advantage, it will be well to consider the system in detail.

Assume that if the discharge devices 57 and 59 are gaseous discharge devices they are initially in an energized condition and if they are high vacuum devices, the current transmitted by them is of considerable magnitude. When a difference of potential exists between the terminals 45 and 47 one of the terminals is positive relative to the other. Assume that the positive terminal is 45, in which case the negative terminal will be 47. The control electrode 53 will therefore be positive with respect to the control electrode 55. The cathodes 67 and 69 of the discharge devices 57 and 59 are at substantially the same potential and they will initially be at a potential intermediate that of the control electrodes 53 and 55. However, since the electrode 53 is the positive control electrode, it is positive relative to its cathode 67 while the control electrode 55 is negative with respect to its cathode 69 which is at the same potential as the cathode 67. Since the control electrode 53 is positive with respect to the cathode 67, current flows between the control electrode 53 and the cathode 67 and immediately they are raised substantially to the same potential.

It follows that the difference of potential which originally existed between the control electrode 55 and the control electrode 53 now exists between the control electrode 55 and the cathode 69, and it is seen that the total potential output between the terminals 45 and 47 has been impressed between the control electrodes 55 and 69 of the discharge device 59. Hence the negative control potential impressed on discharge device 59 is greater than it would be if the potential difference between points 45 and 47 were distributed between both devices 55 and 57. Accordingly, if device 59 is of the gaseous type, a smaller potential will be required between points 45 and 47 to energize it than would be required in the prior art apparatus and if it is of the high vacuum type, the effect produced for a given difference of potential between points 45 and 47 is greater than in corresponding prior art arrangements.

The operation of the system, of course, does not depend on the complete insulation of the electrode 55 and the electrode 53 from the other electrodes and the other elements of the system. Essentially the discharge path between the electrode 55 and its cathode 69 and the discharge path between the electrode 53 and its corresponding cathode 67 constitutes a high impedance path. The impedance of this path, however, is of the order of 100 megohms and therefore leads to a situation which is entirely different from that which would be attained with a relatively low resistor actually connected between the control electrodes and the cathode.

The inter-electrode impedances involved are shown as broken lines 100 and 200 for the discharge devices 57 and 59, respectively. While I prefer to maintain the control electrodes 53 and 55 entirely disconnected from the other elements of the apparatus except the terminals 45 and 47, it is conceivable and sometimes desirable that my invention may be practiced by connecting one or more high impedances between the control electrode and the cathode of one or both of the discharge devices, or between the control electrode of either of the discharge devices and some point on the system.

It is to be noted that this situation occurs if the impedance or impedances connected between one or the other of the control electrodes and the cathodes of the discharge devices 57 and 59 or the other elements of the system are high compared to the impedance between a positive control electrode of one of the discharge devices 57 or 59 and the corresponding cathode (i. e., between a control electrode and a cathode which are at substantially the same potential).

It is to be noted that the use of infinite or high impedances 100 and 200 has several advantages. One of the advantages arises from the character of the balanced network 29 which is often utilized in the practice of my invention. In two arms of the network photo-sensitive devices 23 and 25 of the missive type are connected. Such photo-sensitive devices have an impedance of from fifty to one hundred megohms even when they are energized. The corresponding arms of the network 29 are therefore high impedance arms. The connection of a relatively low impedance in the place of the impedances 100 or 200 is equivalent to the connection of such a low impedance between the points 45 and 47 of the network. A low impedance between the points 45 and 47 would tend to reduce the sensitivity of the network since it would operate as a shunt for the high impedances.

Another advantage arises when the useful function to be performed by the apparatus depends on the change in plate current output of only one of the discharge devices 57 or 59. In such a case it is desirable that the total potential change between the points 45 and 47 of the network 29 should be impressed on the control circuit of one of the discharge devices. In systems of this type the use of infinite or high impedances 100 or 200 is of advantage regardless of the portion of characteristic of the discharge devices 57 and 59 over which the operation takes place. This feature of the operation is of importance where the discharge devices 57 and 59 are of the gas or vapor-filled type such as grid-glow tubes. The discharge devices are connected as shown in the drawing and the anode cathode potential applied is of such magnitude that they are normally energized. When the network 29 is unbalanced a negative potential is impressed between the control electrode and the cathode of one of the discharge devices and it is deenergized. It is apparent that a smaller change will be required in the network 29 to deenergize one of the discharge devices if the whole potential change is impressed on it than will be required if an attempt is made to deenergize both discharge devices by distributing the potential difference between them.

Where the output of one of the high vacuum discharge devices is balanced against that of another as is the case if the discharge devices 57 and 59 shown in the drawing are of the high vacuum type, my invention has particular advantage if the discharge devices are both normally operated near or above the upper knee of the characteristic curve or in the saturation region. Operation in or just below the saturation region is desirable because the discharge devices are more stable than they are in the proportional region.

This is particularly the case where the discharge devices are highly sensitive. Such discharge devices have characteristics that are steep, particularly in the proportional region. Accordingly, temperature changes and random variations in the characteristic produce marked fluctuations in the output of such devices if the normal control potential is maintained such that the swings are about a point on the straight line portion of the characteristic. The fluctuations are considerably reduced if the normal point is in or near the saturation region and in such a case the effectiveness of the device increases as the negative control potential impressed thereon is increased.

If a low impedance 100 or 200 is utilized, the control potential of one of the discharge devices is rendered positive relative to the cathode while that of the other is negative relative to the cathode when the network 29 is unbalanced. If the normal point is in the saturation region of both discharge devices the last-mentioned distribution will result in only a small change in the plate current of the discharge device on which the positive control potential is impressed and the half of the potential change of the network 29 applied to the last-mentioned discharge device will be lost. On the other hand, if the whole effect is applied as a negative control potential on one of the discharge devices the whole change is utilized.

When the balance of the network 29 is disturbed and the excitation of the discharge devices 57 and 59 is varied as explained above, a current of magnitude and polarity depending on the polarity of the disturbance will be transmitted through the potentiometer 65 that is connected between the anodes 61 and 63 of the discharge devices 57 and 59. Correspondingly a potential difference will be established across the terminals 91 and 93 of a resistor 95 that is coupled between the anodes 61 and 63 of the discharge devices in parallel with the potentiometer 65.

The terminals 91 and 93 of the resistor 95 are connected respectively to the control electrodes 97 and 99 of a plurality of gas-filled electric-discharge devices 101 and 103 through a plurality of suitable grid resistors 105 and 107. The resistor 95 is moreover provided with a center tap 108 which is connected to the movable tap 109 of another potentiometer 111. One terminal 112 of the potentiometer 111 is in turn connected to the center tap 113 of a section 115 of the secondary 117 of a transformer 119 whereby power is supplied to the gas-filled electric-discharge devices 101 and 103. The gas-filled devices are preferably of the hot cathode type and the section 115 of the secondary 117 to the center tap 113 of which the terminal 112 of the potentiometer 111 is connected is utilized for the purpose of energizing their cathodes 121 and 123.

The potentiometer 111 is moreover connected across a portion of the windings of another section 125 of the secondary 117 of the transformer 119 and is thus energized. To one terminal 127 of the last-named section 125 of the secondary 117 a plurality of conductors 129 and 131 are connected. One conductor 129 is connected to the anode 133 of one electric discharge device 101 through a movable contactor 135 of a relay 137 and the exciting coil 139 of another relay 141 while the other conductor 131 is connected to the anode 143 of the other electric discharge device 103 through a movable contactor 145 of the last-named relay 141 and through the exciting coil 147 of the first-named relay 137. Since an intermediate tap 149 of the section 125 of the secondary 117 is connected substantially to the cathodes 121 and 123 of both electric discharge devices 101 and 103, the relays 137 and 141 are energized respectively through the electric discharge devices 103 and 101 and through the movable contactors 145 and 135. The relays 137 and 141 are therefore interlocked and when one electric discharge device is energized the other must necessarily be deenergized.

The relays 137 and 141 are provided with suitable contactors whereby the necessary apparatus for responding to the change in the transmissibility of the elements 19 and 27 is operated. For an example of a control system of this type reference is made to my copending application of which the present application is a continuation-in-part.

While the discharge devices 57 and 59 are in the preferred practice of my invention of the high vacuum hot cathode type, discharge devices of other types may be utilized. Apparatus in which cold unexcited electrodes, mercury electrodes or other electrodes of the same type are utilized is contemplated as lying within the scope of my invention. The same may be said of gas-filled discharge devices of all types.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Radiation responsive apparatus comprising a balanced electrical network having a plurality of arms, said arms intersecting in terminals, photo-sensitive devices in adjacent arms, impedances in other adjacent arms, a plurality of electric discharge devices influenced by said radiation responsive apparatus, each of said devices having a control electrode and a plurality of principal electrodes and means for connecting the control electrode of one of said discharge devices only to the terminal of said network fixed by the intersection of said adjacent arms having photo-sensitive devices therein and means for connecting the control electrode of another of said discharge devices only to the terminal of said network fixed by the intersection of said arms having impedances therein.

2. In combination, a controlled circuit comprising a first electric discharge device having a control electrode and a plurality of principal electrodes, a second electric discharge device having a control electrode and a plurality of principal electrodes, means connecting a principal electrode of said first discharge device to a principal electrode of said second discharge device, means connecting another principal electrode of said first discharge device to another principal electrode of said second discharge device, means interconnecting said first mentioned and said last-mentioned connecting means, a controlling circuit for said controlled circuit comprising means for producing a difference of potential between two points, means for connecting one of said two points to the control electrode only of the first discharge device and the second point to the control electrode only of said second discharge device to control the current supplied to said interconnecting means, the only paths over which current can flow between said controlling circuit and said controlled circuit being of high impedance.

3. In combination, a controlled circuit comprising a first electric discharge device having a control electrode and a plurality of principal electrodes, a second electric discharge device having a control electrode and a plurality of principal electrodes, means connecting a principal electrode of said first discharge device to a principal electrode of said second discharge device, means connecting another principal electrode of said first discharge device to another principal electrode of said second discharge device, means interconnecting said first mentioned and said last-mentioned connecting means, in such manner that the polarity of the net current transmitted through said first mentioned connecting means is determined by the relative magnitude of the currents transmitted between the principal electrodes of each of said discharge devices, a controlling circuit comprising means for producing a difference of potential between two points, means for connecting one of two said points to the control electrode only of the first discharge device and the second point to the control electrode only of said second discharge device to control the current supplied to said interconnecting means, the only paths over which current can flow between said controlling circuit and said controlled circuit being of high impedance.

4. In combination, a controlling circuit and a controlled circuit, said controlled circuit including two electrical discharge devices having interconnected main electrodes, a control electrode in each device, said controlling circuit connected to said control electrodes and having means making one of said control electrodes positive relative to the other said control electrode, the only paths over which current can flow between said controlling circuit and said controlled circuit being of high impedance.

5. In combination, a controlling circuit and a controlled circuit, said controlled circuit including two electrical discharge devices having interconnected main electrodes, a control electrode in each device, said controlling circuit connected to said control electrodes and having means making one of said control electrodes positive relative to the other said control electrode, said means including a balanced-impedance network, the only paths over which current can flow between said controlling circuit and said controlled circuit being of high impedance.

6. In combination, a controlling circuit and a controlled circuit, said controlled circuit including two electrical discharge devices having interconnected main electrodes, a control electrode in each device, said controlling circuit connected to said control electrodes and having means making one of said control electrodes positive relative to the other said control electrode, the only paths over which current can flow between said controlling circuit and said controlled circuit being of the order of 100 megohms.

7. In combination, a controlling circuit and a controlled circuit, said controlled circuit including two electrical discharge devices having interconnected main electrodes, a control electrode in each device, said controlling circuit connected to said control electrodes and having means making one of said control electrodes positive relative to the other said control electrode, said means including a balanced-impedance network, the only paths over which current can flow between said controlling circuit and said controlled circuit being of the order of 100 megohms.

8. In combination, a controlling circuit and a controlled circuit, said controlled circuit including two electrical discharge devices having interconnected main electrodes, a control electrode in each device, said controlling circuit connected to said control electrodes and having no other connection, exterior to said electrical discharge devices, with said controlled circuit, and means making one of said control electrodes positive relative to the other said control electrode.

9. In combination, a controlling circuit and a controlled circuit, said controlled circuit including two electrical discharge devices having interconnected main electrodes, a control electrode in each device, said controlling circuit connected to said control electrodes and having no other connection, exterior to said electrical discharge devices with said controlled circuit, and means making one of said control electrodes positive relative to the other said control electrode, said means including a balanced-impedance network.

10. In combination, a controlling circuit and a controlled circuit, said controlled circuit including two electrical discharge devices having interconnected main electrodes, a control electrode in each device, said controlling circuit connected to said control electrodes and having means making one of said control electrodes positive relative to the other said control electrode, the only paths over which current can flow between said controlling circuit and said controlled circuit being of high impedance, said electric discharge devices being high vacuum discharge devices, the relationship between the control potential and the positive main electrode potential impressed on said discharge devices being normally such that the discharge devices are normally operated in the saturation regions of their characteristic.

11. In combination, a controlling circuit and a controlled circuit, said controlled circuit including two electrical discharge devices having interconnected main electrodes, a control electrode in each device, said controlling circuit connected to said control electrodes and having means making one of said control electrodes positive relative to the other said control electrode, the only paths over which current can flow between said controlling circuit and said controlled circuit being of high impedance, said electric discharge devices being gas filled devices, the relationship between the control potential and the positive main electrode potential impressed on said discharge devices being normally such that the discharge devices are normally energized.

12. In combination, a controlled circuit comprising a first electric discharge device having a control electrode and a plurality of principal electrodes, a second electric discharge device having a control electrode and a plurality of principal electrodes, means connecting a principal electrode of said first discharge device to a principal electrode of said second discharge device, means connecting another principal electrode of said first discharge device to another principal electrode of said second discharge device, means interconnecting said first mentioned and said last-mentioned connecting means, in such manner that the polarity of the net current transmitted through said first mentioned connecting means is determined by the relative magnitude of the currents transmitted between the principal electrodes of each of said discharge devices, a controlling circuit comprising means for producing a difference of potential between two points, means for connecting one of said two points to the control electrode only of the first discharge device and the second point to the control electrode only of said second discharge device to control the current supplied to said interconnecting means, said electrodes connected by said second-mentioned connecting means are of the type capable of being excited to emit electrons.

FINN H. GULLIKSEN.